United States Patent [19]

Verzella et al.

[11] 4,385,356
[45] May 24, 1983

[54] NON-SATURATING AIRSPEED/ATTITUDE CONTROLS

[75] Inventors: David J. Verzella, Guilford; William C. Fischer, Monroe; Don L. Adams, Fairfield; Stuart C. Wright, Milford, all of Conn.

[73] Assignee: United Technologies Corporation, Hartford, Conn.

[21] Appl. No.: 249,302

[22] Filed: Mar. 30, 1981

[51] Int. Cl.³ .................. G06F 15/50; G06G 7/78
[52] U.S. Cl. .................... 364/434; 244/17.13; 244/177; 244/182
[58] Field of Search ............ 364/434; 244/17.13, 244/177, 178, 179, 181, 182, 194

[56] References Cited

U.S. PATENT DOCUMENTS

| | | | |
|---|---|---|---|
| 3,711,042 | 1/1973 | Rempfer et al. | 244/179 X |
| 4,129,275 | 12/1978 | Gerstine et al. | 244/181 |
| 4,168,045 | 9/1979 | Wright et al. | 244/17.13 |
| 4,206,891 | 6/1980 | Perez et al. | 244/17.13 |
| 4,304,375 | 12/1981 | Builta et al. | 244/17.13 |

*Primary Examiner*—Jerry Smith
*Attorney, Agent, or Firm*—M. P. Williams

[57] ABSTRACT

In a helicopter automatic flight control system having both automatic pitch attitude retention (70, 71) and automatic airspeed hold (84) and responsive both to pitch attitude error (206) and integrated (241) airspeed error (230), saturation of either the attitude error or integrated airspeed error circuitry is avoided by sensing (171) integrated airspeed error buildup to a threshold magnitude (which may be a significant fraction of the instantaneous authority of the automatic flight control system), and causing (169, 167) automatic slewing of the pitch attitude reference signal toward the current pitch attitude and reduction of the integrated airspeed error. In a disclosed embodiment, the correction of attitude reference and reduction of airspeed error is effected by utilizing an equal effective time constant (220, 221; 258, 259) for both actions over the same period of time (170, 168, 175).

4 Claims, 4 Drawing Figures

FIG. 4

NON-SATURATING AIRSPEED/ATTITUDE CONTROLS

DESCRIPTION

1. Technical Field

This invention relates to automatic flight control systems for aircraft, and more particularly to improvements in airspeed/attitude controls therefor.

2. Background Art

In fixed wing aircraft, speed is normally controlled by engine thrust, and at any speed, aircraft pitch attitude (nose up or nose down) is utilized to control altitude. If speed is increased without adjusting pitch attitude, the aircraft will inevitably climb. In rotary wing aircraft (helicopters), the forward thrust required for increased speed is achieved by a combination of increased longitudinal cyclic pitch (nose down) with increased collective pitch (normal to the rotation of the main rotor blades).

Early automatic flight control systems for helicopters controlled speed simply by means of attitude adjustments. If an automatic flight control system includes both airspeed hold and pitch attitude hold functions, a desired airspeed (before engaging the airspeed hold function) is normally achieved by pilot maneuvering of the longitudinal cyclic pitch control, anticipating the necessary attitude for the desired speed (the speed that will be achieved when the aircraft settles in a new attitude at the conclusion of the pilot maneuver), and then automatic control over the aircraft pitch attitude in response to an airspeed error signal developed as the difference between the airspeed reference signal synchronized to the airspeed at the conclusion of the maneuver, and the then current airspeed.

The automatic flight control system may control the longitudinal cyclic pitch of the helicopter in simultaneous response both to airspeed and pitch attitude variations. A system of this type is disclosed in a commonly owned copending U.S. patent application entitled ATTITUDE TRIMMED AIRSPEED/ATTITUDE CONTROLS, Ser. No. 249,267, filed Mar. 30, 1981 by Adams et al. Naturally, if the attitude is synchronized at an attitude which will not provide the desired airspeed under the current flight parameters (cyclic pitch, loading, etc.), then there is a tendency for the attitude error signal to fight the airspeed error signal.

In such a system, it is necessary to provide integral gain in the airspeed control, so that when the desired airspeed is reached, and the airspeed synchronizing circuit provides a zero airspeed error, there will be an integrated airspeed command which will offset the pitch attitude error signal provided by the pitch attitude synchronizing circuit. However, this naturally results in two integrators holding signals, which cause equal and opposite command signals that cancel each other out, to cause the proper command to the pitch attitude control system. If, due to various perturbations, one of these becomes saturated by being driven to the extent of its capability, then further control would be compromised. For instance, if the aircraft is flying at a desired pitch and airspeed, and the aircraft undergoes a head-on gust of wind that lowers its airspeed without materially affecting the pitch attitude, the error from the airspeed synchronizer will cause integration of the airspeed integral path quite rapidly, which will in turn force attitude changes that will cause an attitude error to build up. Once the airspeed is recovered, the airspeed synchronizer error will go to zero, but the integral path of the airspeed command will not be driven in the opposite direction until after the desired speed has been acquired, and the pitch attitude error causes a slight overshoot of aircraft speed beyond that which was desired. In the interim, either the attitude or the airspeed channel would become saturated and unable to reacquire the desired airspeed and attitude.

Also, if the pilot is maneuvering the longitudinal cyclic pitch control to achieve a desired airspeed, and in anticipation thereof ends the pitch attitude maneuver and locks on the airspeed at that time, the lag in airspeed actually achieved as a consequence of pitch attitude will cause an airspeed overshoot. In order for the airspeed error to thereafter readjust the pitch attitude of the aircraft for desired airspeed, the attitude synchronizer will provide an equal but opposite error, which may be sufficient to cause either the attitude or the airspeed circuits to become saturated.

DISCLOSURE OF INVENTION

Objects of the invention include provision of improved combined airspeed and attitude control over the pitch axis of an aircraft.

According to the present invention, whenever the integrator output of an integral gain path of an airspeed hold system reaches a significant fraction of its operating range, it automatically reduces its own integrated output as well as adjusts the reference signal for the pitch attitude synchronizer, to reduce the amount by which the two systems are providing offsetting input commands to the pitch axis of the automatic flight control system. According further to the present invention, the integrator output of an airspeed hold integral path is slewed downwardly at the same rate and for the same period of time as the pitch attitude reference voltage is slewed toward the actual aircraft pitch attitude, whereby the degree to which the two systems are providing equal but opposite inputs to the pitch axis of an automatic flight control system is diminished.

The invention avoids saturating the airspeed hold system, or the pitch attitude synchronizing system, and does so without any change in actual command provided to the pitch axis of the automatic flight control system. Further, rather than any attempt to adjust these by identical amounts, the invention slews the pitch attitude reference voltage toward the actual pitch attitude of the aircraft at the same rate and for the same time as the integrated airspeed error is slewed toward zero, thereby providing perfectly balanced automatic recentering of an attitude/airspeed system.

The invention may be implemented utilizing analog, digital or computerized signal processing, utilizing only apparatus and techniques which are well within the skill of the art in the light of the specific teachings which follow hereinafter with respect thereto.

The foregoing and other objects, features and advantages of the present invention will become more apparent in the light of the following detail description of exemplary embodiments thereof, as illustrated in the accompanying drawings.

BRIEF DESCRIPTION OF DRAWINGS

FIG. 4 is a simplified schematic block diagram of pitch attitude synchronizing and beeping circuitry and of airspeed control circuitry for the automatic flight control system of FIG. 1.

BEST MODE FOR CARRYING OUT THE INVENTION

Figure 1:
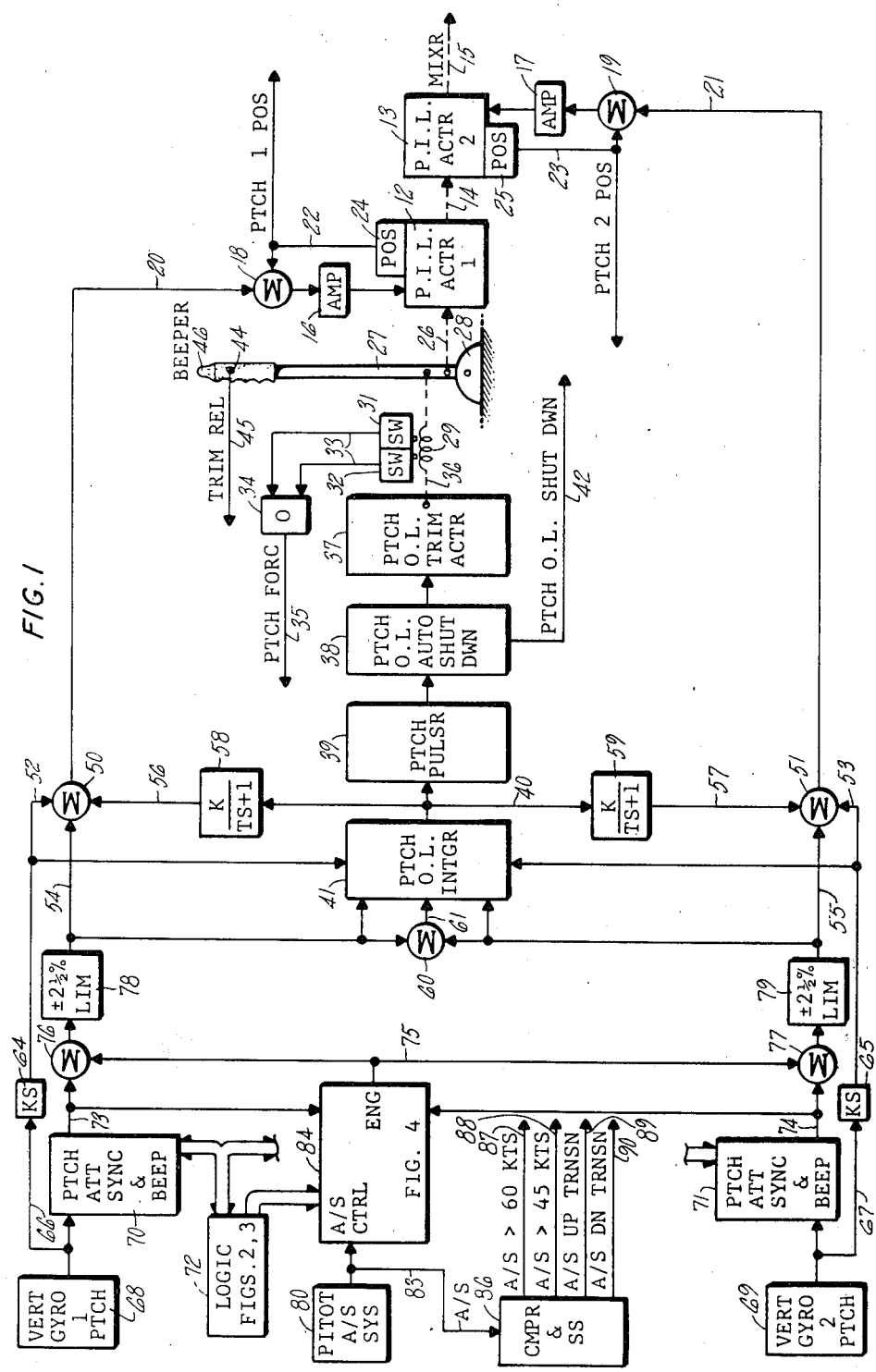
FIG. 1 is a simplified schematic block diagram of an aircraft automatic flight control system in which the present invention may be implemented.

Referring now to FIG. 1, a helicopter longitudinal cyclic pitch control system for controlling the pitch axis attitude of a helicopter, within which the present invention may suitably be implemented includes a pair of inner loop longitudinal cyclic pitch actuators 12, 13 which are connected together by suitable linkage 14 and to a main rotor blade pitch angle swash plate mixer (not shown) by suitable linkage 15. Each of the actuators is driven by a corresponding amplifier 16, 17 in a nulling servo loop fashion. The amplifiers respond to error signals from corresponding summing junction 18, 19 which provide the amplifiers with a signal indicative of the difference between a pitch command signal on a related line 20, 21 and a signal provided on a related line 22, 23 by a corresponding actuator position sensor 24, 25 which is indicative of the achieved position of the actuator. When the actuators 12, 13 have achieved positions corresponding to the signals on the lines 20, 21 the error signal provided by the summing junctions 18, 19 to the amplifier 16, 17 goes to zero, so the actuators will remain at rest until the signals on the lines 20, 21 are changed (or drift showing up in the lines 22, 23).

The actuators 12, 13 are also connected by mechanical linkage 26 to a cyclic pitch control stick 27 which is pivoted within a gimbal 28 for forward and aft motion against the operation of a trim position spring 29. A pair of switches 31, 32 are disposed on the actuator 37 for detecting motion of the stick 27 against the spring 29 in respective directions. Closure of either switch 31, 32 will provide a signal on a corresponding one of two lines 33 to cause an OR circuit 34 to provide a pitch force signal on a line 35. In various embodiments, the OR function provided by the circuit 34 may simply be implemented by the relationship of the switches 31, 32, as is known in the art.

The cyclic pitch stick 27 is connected by mechanical linkage 36 and spring 29 to a pitch outer loop trim actuator 37 which is driven through pitch automatic shutdown circuits 38 and pitch pulser circuits 39 by a signal on a line 40 provided by a pitch outer loop integrator circuit 41. These circuits are described in detail in a commonly owned copending U.S. patent application entitled PULSED AIRCRAFT ACTUATOR, Ser. No. 249,300, filed Mar. 30, 1981 by Fischer et al. These circuits serve to reposition the cyclic pitch stick 27 to a position indicative of the actual commands being provided to the linkage 15 as a consequence of motion of the actuators 12, 13. The pitch auto shutdown circuit 38 provides a pitch outer loop shutdown signal on a line 42. The cyclic pitch stick 27 has a switch 44 that can be closed by a thumb or finger so as to provide a trim release signal on a line 45. The stick 27 also has a "coolee hat" type of four-axis beeper switch 46 that can be moved forward or aft (or right or left) to provide beep signals; in a system of the type described, the beep signals are signals which force small changes in the attitude reference signals.

The pitch command signals on the lines 20, 21 are each provided by a corresponding summing junction 50, 51, which sum together corresponding pitch rate signals on lines 52, 53, pitch attitude and airspeed control signals on lines 54, 55 and outer loop compensation signals on lines 56, 57. The outer loop compensation signals are provided by lag amplifiers 58, 59 which are driven by the output of the pitch outer loop integrator on the line 40.

The signals on the lines 52-55 are applied to the pitch outer loop integrator 41 in order to detect high pitch attitude demand changes. The pitch attitude signals on the lines 54 and 55 are applied to a summing junction 60, the output of which is applied to the pitch outer loop integrator 41 on a line 61.

The signals on the lines 52, 53 are provided by differentiators 64, 65 from gyro pitch signals on lines 66, 67 which are provided by the pitch axis outputs of corresponding vertical gyros 68, 69. The signals on the lines 66, 67 are also compared with attitude reference signals in pitch attitude synchronizing and beep circuitry 70, 71. When the circuits 70, 71 are synchronized, the reference follows (is made equal to) the signal on the corresponding lines 66, 67 indicative of actual pitch angle of the helicopter; when beeping is employed, the reference is forced to equal a greater or lesser pitch angle; when the circuits 70, 71 are not synchronized, they provide pitch error signals on related lines 73, 74 indicative of the variance between the actual pitch angle of the helicopter and the desired helicopter pitch attitude. Logic circuits 72 are connected with the pitch attitude synch and beep circuits 70, 71 to control the operation thereof. In systems of the type disclosed herein, the signals on the lines 73, 74 are summed with a signal on a line 75 in corresponding summing junctions 76, 77, the resultant of which is applied to a related limiter circuit 78, 79 so as to provide the pitch attitude and airspeed control signals on the lines 54, 55 limited to 2½% of total pilot authority. Thus, the short term automatic pitch axis inner loop control which can be provided by means of the actuators 12, 13 is limited to ±5% (total, 10%) of total pilot authority.

A pitot-static airspeed system 80, of any suitable well known type, provides an airspeed signal on a line 83 to airspeed control circuits 84. The airspeed control circuit 84 may also respond to the pitch attitude error signals on the lines 73, 74 so as to provide, over the line 75, increased gain in attitude control when the airspeed control circuitry 84 is engaged. The airspeed signal on the line 83 might be utilized in circuitry 86, which includes compare circuits and single shot circuits (monostable multi-vibrators), or other signal transition detecting circuits, to provide signals on a plurality of lines 87-90 indicative of airspeed being greater than 60 knots or 45 knots, and transitions from above 45 knots to below 45 knots, respectively. This circuitry may be of the type disclosed in U.S. patent application of Clelford et al, Ser. No. 176,832, filed on Aug. 8, 1980, or may be of other types of hardware or software.

Figure 2:
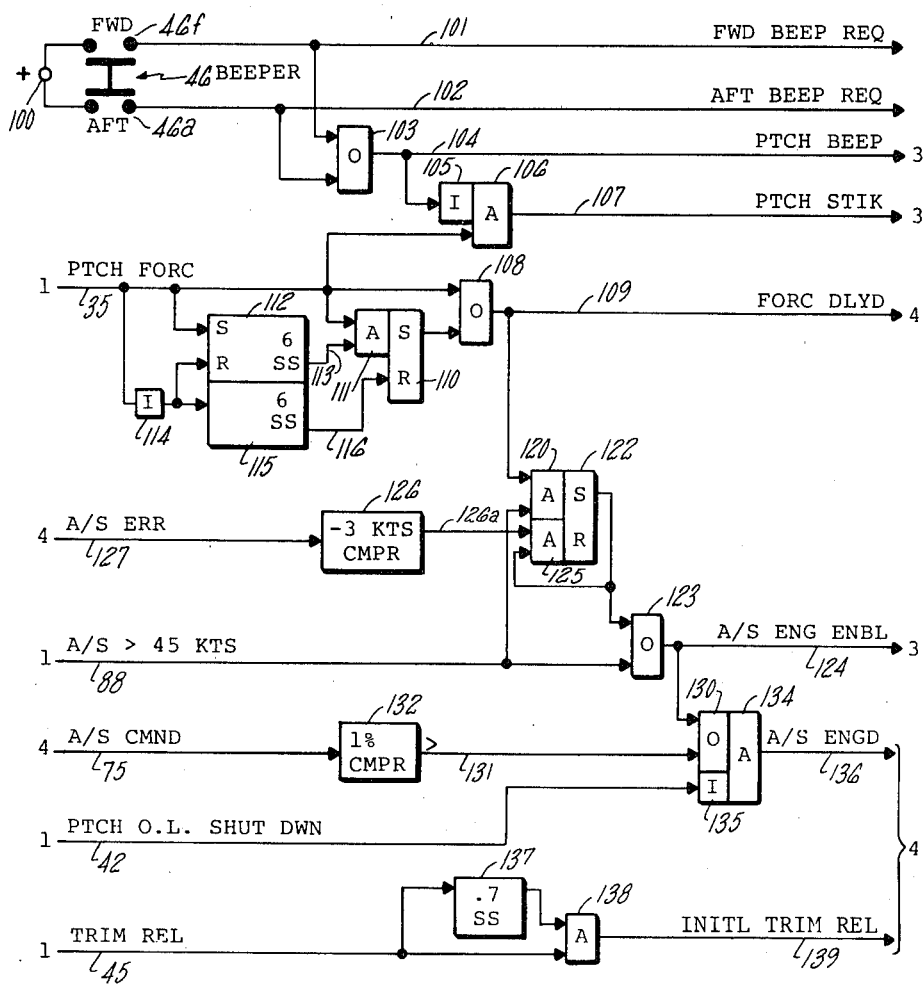
FIGS. 2 and 3 are simplified block diagrams of circuitry for providing control signals for the automatic flight control system of FIG. 1.

Referring now to FIG. 2, the logic circuits include a suitable voltage source 100 which is connected through the beeper 46 so as to provide a forward beep request signal on a line 101 upon closure of beeper contact 46f and to provide an aft beep request signal on a line 102 in response to closure of contact 46a. An OR circuit 103 is responsive to a signal on either of the lines 101, 102 to provide a pitch beep signal on a line 104. An inverter 105 is responsive to the signal on the line 104 to prevent the operation of an AND circuit 106 which otherwise is responsive to the pitch force signal on the line 35 to provide a pitch stick signal on a line 107. The pitch stick signal on the line 107 is indicative of the fact that the pilot has moved the stick 27 sufficiently in one direction or the other so as to close one of the switches 31, 32, but has done so other than as a consequence of pushing the beeper switch 46; this enables distinguishment between pitch force signals on the line 35 which really are as a consequence of overzealous pushing of the beeper switch 46, and pitch force signals on the line 35 which are indicative of an intentional control input by the pilot through the pitch stick.

The pitch force signal on the line 35 is also applied to an OR circuit 108 to provide a force delayed signal on a line 109. The force delayed signal is indicative of the pitch force signal on the line 35, and is also indicative of the fact that after the pitch force signal on the line 35 has been present for six seconds, it thereafter remains present until six seconds after force is removed. This is achieved by having the OR circuit 108 connected to the set output of a bistable device 110 which is set in response to an AND circuit 111 operable by the presence of an output from a six second resettable single shot 112 concurrently with the pitch force signal on the line 35. The single shot 112 is in turn initiated (at its set input) by the pitch force signal on the line 35 and will, when initiated, initially lose the signal on a line 113 at its complementary output, but after six seconds will regain the signal on the line 113 and apply it to the AND circuit 111, unless the single shot 112 is reset prior thereto by a signal from an inverter 114 as a consequence of the pitch force signal no longer being present on the line 35. Thus, if the pitch force signal on the line 35 lasts for less than six seconds, the bistable device 110 will not become set. But if it lasts for more than six seconds, the bistable device 110 will become set. When the pitch force signal disappears from the line 35, the inverter 114 starts another six second single shot 115 and causes the signal on its complementary output to disappear so there is no signal on a line 116 to the reset input of the bistable device 110. But after the expiration of the six second pulse, the complementary output will again achieve a signal on the line 116, the rise of which will cause resetting of the bistable device 110. Thus the OR circuit 108 will provide a force delayed signal during the presence of pitch force, and if pitch force lasts at least six seconds, it provides the force delayed signal for six seconds after termination of the pitch force signal on the line 35. As is described more fully hereinafter with respect to FIG. 4, this prevents the airspeed control circuits 84 from integrating airspeed error during pilot input and for six seconds after he completes a maneuver.

The force delayed signal on the line 109 is also utilized to signify a significant pilot input in the pitch axis which may (if in the aft direction) cause the airspeed of the helicopter to drop below that at which an automatic airspeed hold function (described more fully hereinafter) is to be engaged. For instance, if the pilot induces a significant nose-up or slow-down maneuver, the airspeed may fall below 45 knots (used in the example herein to be exemplary of the airspeed hold function). But, custom or government regulation frequently requires that removal of stick force (following a maneuver commenced while the airspeed hold function is engaged) should cause the original, reference airspeed to be recovered automatically. Therefore, the airspeed hold function should not become disengaged if it was engaged prior to dropping below the critical airspeed. The force delayed signal on the line 109 is therefore fed to an AND circuit 120 which is operative whenever there is a signal on a line 88 indicating that airspeed is greater than 45 knots. The AND circuit causes a bistable device 122 to become set thereby providing a signal to an OR circuit 123 that is also responsive to the airspeed greater than 45 knots signal on the line 88. This provides an airspeed engage enable signal on a line 124 whenever the airspeed is above 45 knots, or, having been above 45 knots when force is applied to the stick. The bistable 122 will remain set until the airspeed recovers to substantially the initial airspeed as indicated by a signal input to an AND circuit 125 which is generated by a compare circuit 126 which includes a $-3$ knots reference. The circuit 126 is responsive to a signal on a line 127 to indicate when the airspeed error (the difference between the reference airspeed and actual airspeed) is within $-3$ knots. Thus the signal on line 125a indicates that the aircraft has recovered a speed which is not more than 3 knots lower that the original reference airspeed. As a consequence of the foregoing, the bistable 122 will become set when airspeed is greater than 45 knots if force is applied to the pilot, and will thereafter remain set until force is removed and airspeed is within 3 knots of reference airspeed. Thus the airspeed engage enable signal is present on the line 124 whenever the airspeed is greater than 45 knots, or when the airspeed has been greater than 45 knots, a stick force has been applied, and the aircraft has not yet regained all but 3 knots of the original airspeed.

The airspeed engage enable signal on line 124 is applied to an OR circuit 130 which is also responsive to a signal on a line 131 from a compare circuit 132 that is responsive to the airspeed command signal on the line 75. The compare circuit 132 has a reference voltage in it which is equivalent to $\pm 1\%$ of full pilot authority; therefore the signal on the line 131 will be present unless the airspeed command on the line 75 is essentially nil. This avoids having the airspeed controls disengage (by transition in speed to less than 45 knots) while there is a large airspeed command, which could cause a jump in the pitch command. The OR circuit 130 feeds an AND circuit 134 that is blocked by an inverter 135 whenever the pitch outer loop shutdown signal is present on the line 42. Therefore, whenever the pitch outer loop is operative, and the airspeed is greater than 45 knots, there will be an airspeed engaged signal on a line 136. The airspeed engage signal on line 136 will continue to be present even though the airspeed drops below 45 knots if force is applied to the stick, and this condition of forcing the airspeed engaged to remain present below 45 knots will continue until the airspeed error is less than minus 3 knots (the present airspeed is within 3 knots of the original airspeed before the force was applied).

At the bottom of FIG. 2, the trim release signal on the line 45 is applied to a 7/10 second single shot 137, the output of which enables an AND circuit 138 to provide an initial trim release signal on a line 139 during the first 7/10 second of the appearance of the trim release signal on the line 45. When the 7/10 of a second has timed out, the output of the single shot 137 will disappear, blocking the AND circuit 138 to end the initial trim release signal on the line 139.

Figure 3:
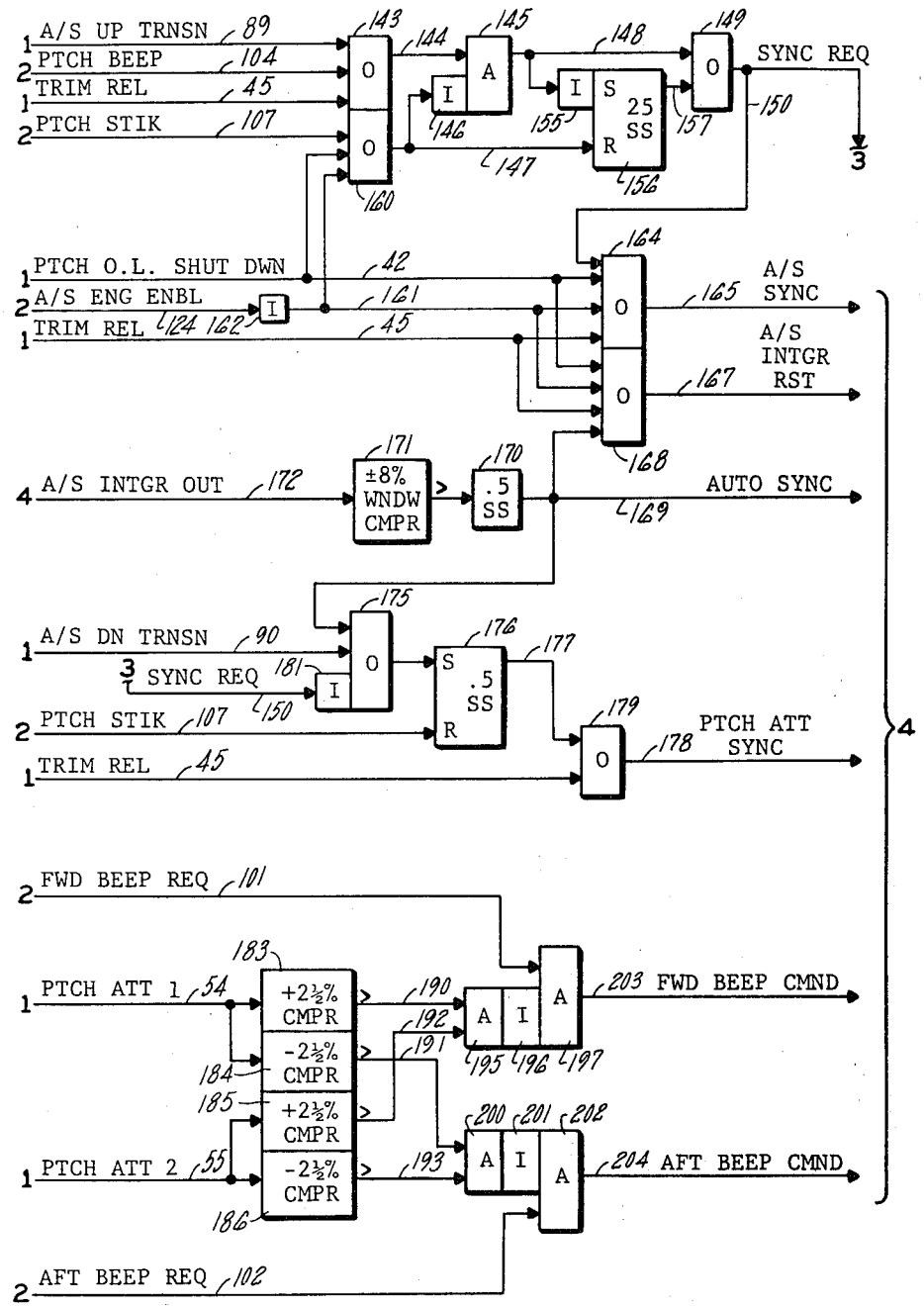

Referring now to FIG. 3, an OR circuit 143 responds to the airspeed up transition signal on the line 89, the pitch beep signal on the line 104, or the trim release signal on the line 45 to provide a signal on a line 144 that will be passed by an AND circuit 145, provided an inverter 146 is not activated by a signal on a line 147. The AND circuit 145 provides a signal on a line 148 that causes an OR circuit 149 to generate a synch request signal on a line 150. The signal on the line 148 is applied to an inverter 155 so that when the signal disappears, the inverter 155 will energize the set input of a 25 second single shot 156, the true output of which on a line 157 is applied to the OR circuit 149. This means that, in the usual case, once the synch request signal is generated on the line 150 by a signal on the line 148, that signal will be maintained for 25 seconds after the signal on the line 148 disappears, due to the signal on the line 157 which is present for 25 seconds after the signal disappears from the line 148. The purposes for this are described more fully hereinafter.

The signal on the line 147 is provided by an OR circuit 160 in response to the pitch stick signal on the line 107 (indicating that the pilot intends to apply force to the stick), or the pitch outer loop shutdown signal on the line 42 (indicating that there will no longer be any pitch outer loop inputs to the mixer), or in response to a signal on a line 161 from an inverter 162 indicative of the absence of an airspeed engage enable signal on the line 124. Thus the signal on the line 147 is indicative of the airspeed being or soon to become disengaged, the pilot inducing an intentional input, or the loss of the pitch outer loop input. The signal on the line 147, being applied to the inverter 146 and to the reset side of the single shot 156 will prevent the OR circuit 149 from presenting the synch request signal on the line 150. If a synch request is in process, it will terminate in response to any of these signals. The main function of the synch request signal is to provide, through an OR circuit 164, an airspeed synchronizing signal on a line 165. This signal can also be presented in response to signals on the lines 42 or 161, or in response to the trim release signal on the line 45. As is described hereinafter, the airspeed synch signal on the line 165 causes the airspeed reference signal to be equal to current airspeed at all times when it is present. Thus whenever the pilot presses the trim release, all of the cyclic pitch autopilot functions (airspeed, pitch attitude and roll attitude) are terminated and new references are established as long as the trim release is pressed. Whenever automatic airspeed hold is (or is about to be) ended, the airspeed error is forced to zero (meaning no airspeed input to the system) by the airspeed synch signal on the line 165. There is no airspeed hold permitted when the pitch outer loop is shut down. Otherwise, the OR circuit 143 generally causes a 25 second airspeed synch signal unless it is previously terminated by the OR circuit 160, for any operation of pitch beep or trim release (no matter how short) or upon a transition from below 45 knots or above 45 knots, and is held for 25 seconds after the termination of such events.

An airspeed integrator reset signal is generated on a line 167 by an OR circuit 168 in response to any of the three signals on lines 42, 161, or 45, or in response to an auto-synch signal on a line 169. The auto-synch signal on the line 169 is a pulse provided by a half-second single shot 170 whenever there is an output from a window comparator 171 that compares the output of the airspeed integrator on a line 172 with plus and minus reference voltages equivalent to 8% of full pilot authority. As described hereinafter with respect to FIG. 4, whenever the airspeed integral gain path is providing a signal equal to ±8% of pilot authority, it causes a slewed reduction in the integrator output for a half-second, along with a commensurate reduction in the attitude synchronizer integrator. This will reduce the opposing authorities of the airspeed and attitude inputs to the system while retaining the balance between them.

The auto-synchronizing signal on the line 169 is also applied to an OR circuit 175 to cause the pitch attitude synchronizer to have the equivalent half-second slewed reduction in the pitch attitude reference value. The OR circuit 175 will activate a half-second, resettable single shot 176 which therefore provides a half-second pulse on a line 177, unless that pulse is terminated by application of the pitch stick signal on the line 107 to the reset input of the single shot 176. Thus, in the normal course of events, the generation of the half-second auto-synch pulse on the line 169 will commensurately cause a half-second pitch attitude synch pulse on a line 178 from OR circuit 179 that is responsive to the single shot 176. In addition, the pitch attitude synch signal on the line 178 is continuously present during trim release as indicated by the signal on the line 45. And, half-second pitch attitude synch pulses can also be provided anytime there is a transition from above 45 knots to below 45 knots as a consequence of the airspeed down transition signal on the line 90 being applied to the OR circuit 175. Also, whenever the synch request signal on the line 150 terminates, an inverter 181 will operate the OR circuit 175 to provide a pitch attitude synch signal on a line 178. Thus a trim release signal can simultaneously provide the pitch attitude synch signal on a line 178, cause a commensurate signal on the line 148 to generate a synch request signal on the line 150, cause signal shot 156 to extend the synch request signal on the line 150 for 25 seconds after disappearance of the trim release signal, so that the airspeed remains synchronized for 25 seconds after the pitch attitude has ceased to be synchronized, and when the 25 seconds are up, the absence of the synch request will cause one last pulse of pitch attitude synch signal on the line 178. The utilization and purposes of these signals are described more fully with respect to FIG. 4 hereinafter.

Referring to the bottom of FIG. 3, a plurality of comparators 183-186 are responsive to the pitch attitude and airspeed signals on the lines 54, 55 to provide corresponding signals on lines 190-193 whenever the pitch attitude and airspeed command signals on the lines 54, 55 are greater than ±2½% of pilot authority. Thus, if both of the pitch attitude and airspeed signals on the lines 54, 55 are in excess of +2½% of pilot authority signals will be present on the lines 190 and 192 which will cause an AND circuit 195 to operate an inverter 196 and therefore block an AND circuit 197. On the other hand, if both of the pitch attitude signals on the lines 54, 55 have magnitudes equivalent to more than −2½% of pilot authority, these will be signals present on lines 191 and 193 which will cause an AND circuit 200 to operate an inverter 201 so as to block an AND circuit 202. This is a beep inhibit function that prevents any attempt to beep in the same direction as an existing saturating pitch attitude and airspeed command, so that the reference will not continually lead the system beyond the capability of the system to respond in view of the 2½% limiters 78, 79 (FIG. 1). As an example, if a helicopter takes off and then noses down to gain speed, spurious aerodynamic effects could cause the helicopter to retain a relatively more level attitude than that which is being commanded to the maximum 5% pilot authority. Should the pilot attempt to beep the nose further over the greater airspeed, the inner loop pitch actuators will not be able to command additional nose down attitude over a relatively long term of several seconds or more. Any attempt to beep the nose over a greater rate would simply build up the attitude reference voltage beyond what the aircraft can respond to. As the aircraft tends to recover, it can nose over (tuck under) in an undesirable overshooting fashion. Thus, whenever the pitch channels of the aircraft are driving the inner loop to the maximum electrical limit, no beeping (no driving of the reference) is permitted in that direction, to preclude any overshoot command condition to develop.

Figure 4:
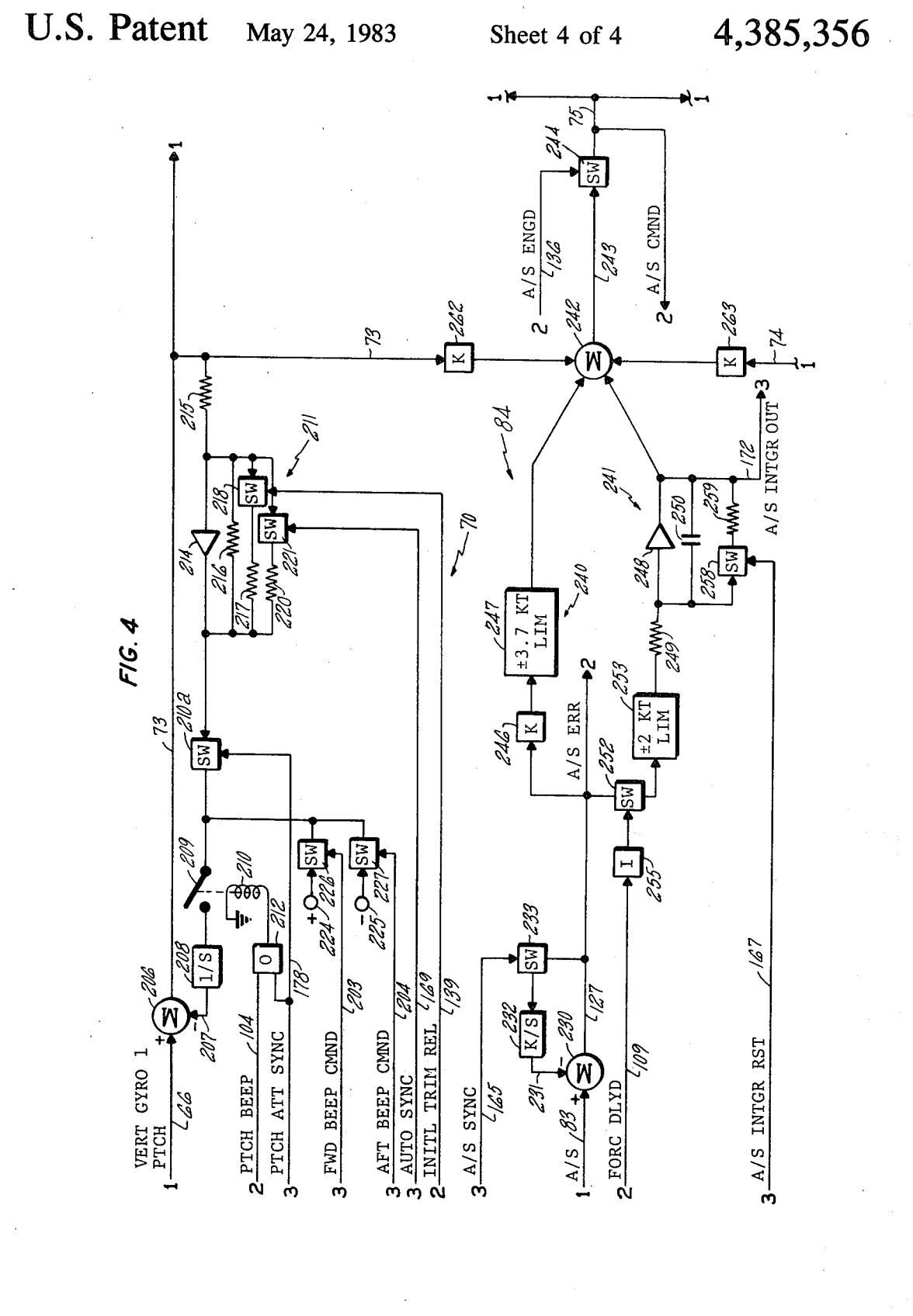

Referring now to FIG. 4, the pitch attitude synch and beep circuits 70 comprise a unique modification of the typical integral feedback circuit of the type known in the art, such as that disclosed in the aforementioned Clelford patent. Specifically, a summing junction 206 subtracts a pitch attitude reference signal on a line 207 from the pitch axis output of the first vertical gyro on the line 66 so as to provide the pitch error signal on the line 73. The reference signal on the line 207 is established and held by an integrator 208, the input of which is controlled by a contact 209 of a normally open relay which closes when its coil 210 is energized. When the contact 209 is closed, and provided a switch 210a is energized, then the error signal on line 73 is fed back through a variable gain amplifier 211 to the input of the integrator 208. Thus, depending upon the gain of the amplifier 211 and the length of time during which it is connected to the input of the integrator 208, the integrator 208 will integrate until it has an output voltage on the line 207 which is equal to the pitch voltage on the line 66, so that the pitch error signal on the line 73 is zero, and no further integration occurs. This is called synchronizing. Synchronizing occurs by virtue of the pitch attitude synch signal on the line 178 causing an OR circuit 212 to operate the coil 210 and close the contact 209, as well as operating the switch 210a so as to interconnect the amplifier 211 with the integrator 208.

The amplifier 211 consists of an operational amplifier 214, the gain of which is the balance between an input resistor 215 and feedback resistance. Normally, the only feedback resistance is provided by a resistor 216. But in certain circumstances, other resistors are placed in parallel therewith so as to lower the feedback resistance and thereby significantly decrease the gain. For instance, a resistor 217 is placed in circuit by closing a switch 218 in response to the initial trim release signal on the line 139. Thus, when trim release is the signal that (through the OR circuit 179, FIG. 3), causes the pitch attitude synch signal on the line 178, the amplifier 211 will have a relatively low gain during an initial 7/10 of a second due to the appearance of the initial trim release signal on the line 139 causing the switch 218 to insert the resistance 217 to significantly lower the feedback resistance. After 7/10 second, the signal on line 139 ends and the high gain is restored. Since the effective time constant of the integrator 208 is an inverse function of the gain of the amplifier 211, the time constant during trim release will initially be relatively large compared to what it is after 7/10 of a second. For instance, the gain of the amplifier 211 may be adjusted so that an initial time constant is 500 MS and after 7/10 of a second the time constant may decrease to 16 MS. The purpose of this function is so that, when trim release is depressed, the reference voltage and therefore the error voltage will initially change relatively slowly for a smooth inner loop command transition. But after the initial time frame (0.7 seconds), the synchronizing circuit responds very quickly to changes which occur as a consequence of variations in the pitch attitude of the aircraft showing up as changes in the pitch axis voltage on the line 66. When the trim release signal ends, the small time constant synchronizing will be accurately reflecting the current pitch angle of the aircraft, causing a nearly nil pitch error signal on the line 73 when the trim release signal is removed. In a manner described more fully hereinafter, a different resistor 220 may be placed in parallel with the resistor 216 by operation of a switch 221 in response to the auto-synch signal on the line 169. Instead of altering the gain of an input amplifier 211, the same effect could be had by selectively switching in different feedback capacitance across an integrating amplifier (within the integrator 208), as is well known to those skilled in the art.

Another function of the synchronizer is to allow slow changes in the reference signal on the line 207 as a consequence of beeping (providing gradual adjustments to) the input to the integrator 208. This may be achieved by the pitch beep signal on the line 104 causing the OR circuit 212 to energize the coil 210 and close the contact 209, without operating the switch 210a. Then, small positive or negative DC voltages from respective sources 224, 225 may be applied through the contact 209 to the input of the integrator 208 by closure of a forward beep command switch 226 or an aft beep command switch 227 in respective response to the forward beep command signal on the line 203 or to the aft beep command signal on the line 204. As described with respect to the circuitry 183-204 in FIG. 3, the integrator 208 is not allowed to be driven further in a given direction when the pitch error signal on the line 73 is such as to be driving the 2½% limiters 78, 79 (FIG. 1) to saturation. Therefore, even though a beep switch may be closed causing the forward or aft beep request signal on the line 101, 102, (FIG. 3), the beep command signals will not be applied to either of the switches 226, 227 so that further error is not incurred. This avoids building up the reference signal way beyond that which is desired as a consequence of the inability of the aircraft to assume the desired attitude in a reasonable time due to aerodynamic effects.

The airspeed circuitry 84 includes airspeed synchronizing circuitry which is a simple version of that described with respect to the pitch attitude synch and beep circuit 70, hereinabove. A summing junction 230 provides the airspeed error signal on the line 127 as the difference between an airspeed reference signal on a line 231 and the airspeed signal on the line 83. The airspeed reference signal on the line 231 is provided by an integrating amplifier 232 which is the equivalent of the combination of the amplifier 211 and the integrator 208 in the upper portion of FIG. 4, or which may simply be an integrator having capcitive feedback along with a resistive input, as is well known in the art. The integrating amplifier 232 is connected to the airspeed error signal on the line 127 whenever a switch 233 is operated by the airspeed synch signal on the line 165. When the switch 233 is closed, the integrating amplifier 232 will, in dependence upon the gain and time constant thereof, provide a reference signal on a line 231 that will cause an airspeed error signal on the line 127 which is essentially nil, thereby to synchronize the airspeed reference to essentially the current airspeed of the aircraft. For no reference leakage, a relay may be used in place of the switch 233.

The airspeed error is fed to a proportional gain path 240 and an integral gain path (241) to a summing junction 242, the output of which on a line 243 is connected through a switch 244 to comprise the airspeed command signal on the line 75, whenever airspeed is engaged as indicated by the signal on a line 136. The proportional gain path 240 consists of an amplifier 246 which feeds a ±3.7 knot limiter 247. This allows a relative high gain near the trim airspeed, without overshooting in response to large airspeed errors. The integral path 241 includes an integrator consisting of an amplifier 248 with a resistive input 249 and a feedback capacitor 250. When a switch 252 is closed, it causes the airspeed error signal on the line 127 to be fed through a ±2 knot limiter 253 to the integrator; the limiter prevents high airspeed error signals from building up to rapidly in the integrator and permitting the contribution of the integral path 241 to become so great as to result in the aircraft overshooting the desired airspeed. Thus, if the airspeed signal on the line 83 changes dramatically as a consequence of a heavy gust or as a consequence of an input by the pilot, without the limiter 253, the error built up in the integrator could cause overcompensation for speed, resulting in a slow oscillation in airspeed (and pitching of the aircraft) as the airspeed settles down thereafter. For the same reason, whenever there are pilot inputs the force delayed signal on the line 109 causes an inverter 255 to open the switch 252 (which could be a relay) so that there will be no input to the integrator, and the errors induced by the pilot input will not continuously build up in the integrator over a long period of time. The airspeed error on the line 127 which builds up during pilot maneuvers will drive the aircraft back to the desired airspeed at the end of pilot maneuvers; so long as the buildup within the integral path 241 is inhibited, only minimal overshoot or consequent oscillation in airspeed will occur as the reference airspeed is regained following pilot maneuver. If the pilot maneuver is long (in excess of 6 seconds), the integrator is held off for 6 seconds after end of pilot input to allow the airspeed to reduce significantly, so as not to drive the integrator with the initial high error, and to reduce the time over which the error is integrated.

As described with respect to FIG. 1, the airspeed command signal on the line 75 (when the airspeed is engaged) is summed with the attitude error on the line 73 (as well as the attitude error on the line 74). Therefore, there is an interrelationship between the pitch attitude synch and beep circuits 70 and the airspeed control circuits 84. In FIG. 4, it is seen that the only way the pilot can beep to a desired airspeed is by beeping attitude.

If a heavy, long trim head-on gust (for instance) reduces airspeed, the airspeed error will build up in the integrator 241, causing an attitude change to regain the airspeed. The attitude change results in an attitude error on line 73. These opposing effects can build up to such a point that their inputs are equal and oppositely saturated. In such a case, retrimming of the whole system could be required should the pilot sense that he lost airspeed retention capability. To avoid that, the auto-synch signal on the line 169 is provided as described hereinbefore whenever the airspeed integrator output reaches ±8% of full pilot authority. In FIG. 3, the auto-synch signal on the line 169 causes the airspeed integrator reset signal on the line 167 which is applied (in FIG. 4) to a switch 258. The switch 258 causes a resistor 259 to be connected in parallel with the capacitor 250 and cause the capacitor to bleed down with an equivalent time constant of one-half second. Simultaneously, the auto-synch signal on the line 169 applied to the switch 221 causes the gain of the amplifier 211 to be reduced by paralleling of the resistor 220 with resistor 216, so that the combination of the amplifier 211 and the integrator 208 will partially synchronize the pitch attitude error on line 73 with a one-half second time constant as well. Thus the pitch attitude error signal on the line 73 is reduced commensurately with the output of the airspeed integrator path 241 at an equal and opposite rate. This transpires only for a half-second because the auto-synch signal on the line 169 is generated by the half-second signal shot 170 (FIG. 3) and the pitch attitude synch signal is generated by the half-second single shot 176 in response to the auto-synch signal on the line 169. Since these circuits are operated with a half-second time constant for one-half second, the reference voltages will be reduced by 63% of their original value whenever that happens. The equal percentage reduction balances out even though the synch circuit 70 provides only half of the opposing gain, the pitch attitude synch and beep circuit 71 (FIG. 1) providing the other half. Thus, the airspeed integrator 241 will reduce from ±8% of full pilot authority to about 3% of full pilot authority as each of the pitch attitude errors (208) reduce from ±4% of pilot authority to about 1.5% of pilot authority. Therefore saturated, equal but opposite operation is automatically avoided, and full control can readily be retained even though the introduction of airspeed errors to trim pitch attitude may cause large pitch attitude errors subsequent to locking onto airspeed.

In order to provide increase gain for additional dynamic stability in the pitch channel when the airspeed control is engaged, a pair of amplifiers 262, 263 apply inputs to the summing junction 242 from the corresponding pitch error signals on the lines 73 and 74.

One feature of the apparatus described is that airspeed control is automatically engaged and automatically disengaged as a function of airspeed. In order to ensure that (other than cases when the outer loop shuts down) the airspeed control does not disengage disruptively, the airspeed control is not allowed to become disengaged except when its output to the pitch channels is very small (as indicated by the 1% comparator 132 in FIG. 2). Thus if the pilot purposely lowers the speed of the aircraft below 45 knots and attempts to trim up on a new airspeed, resynchronization of the pitch attitude channel will cause immediate resynchronizing of the airspeed and pitch attitude errors and resetting of the airspeed integrator (due to the circuitry at the top of FIG. 3). When this synchronizing and resetting occurs, the contribution to the inner loop by the airspeed command will be essentially nil since the pitch attitude error on line 73 (FIG. 4) will supply a small contribution through the amplifier 262 and the airspeed error being essentially nil will supply a small contribution through the proportional path 240 and the airspeed integrator 241. Then, the airspeed engage signal on the line 136 can disappear, opening the switch 244 and returning the aircraft to simple attitude control, rather than a combination of airspeed and attitude control.

The present invention senses that the integrated airspeed error is approaching saturation value (limiters 78, 79) of the automatic flight control system pitch axis, and causes a rebalancing between the pitch attitude trim reference voltage and the integrated airspeed error. This is accomplished in an automatic fashion by causing the airspeed integrator 241 to bleed off at a known time constant for the same period of time that the integrator 208 is caused to track the vertical gyro pitch signal on the line 66 for the same time constant. In the example herein, a half second time constant is used for one-half of a second, (for one time constant) so that the integrated airspeed error will be reduced by 63% at the same time that the pitch attitude error on the line 73 is reduced by 63%. Therefore, the attitude/airspeed system is recentered without any perturbations in the actual command provided to the outer or inner loops of the flight control system. Not only will this avoid any tendency of the airspeed integrator to provide a saturating value into the system (one equal to 10% of pilot authority), but it also reduces the extent of perturbations which could occur as a result of the pilot trimming the attitude system while airspeed control is still engaged.

The foregoing description is in simplified block form, the detailed circuitry being described with respect to simple positive logic utilizing either relay contacts or switches to open and close certain paths, summing junctions (which are understood to be combinations of resistors at the correct inverting and noninverting inputs of suitable amplifiers) single shots which may require reset dominance or may not need one, bistable devices, and the like. Many of the foregoing functions can obviously be achieved in a simpler fashion by using more true and complement outputs and fewer inverters; in many instances the positive logic disclosed may readily be reworked into inverting logic to be more suitably applicable to available hardware chips. The description is, therefore, principally in terms of function achieving blocks, and it should be understood that numerous variations may be utilized for achieving the same or equivalent functions and combinations of functions within the skill of the art. In addition, the functions of the foregoing apparatus (other than the mechanical functions and those functions which directly interface with the mechanical functions) may readily be implemented by utilization of a suitably programmed digital computer. The conversion of the discrete and analog functions described herein to digital functions performed by suitable software in a computer is well within the skill of the art, particularly in the light of the teachings of equivalency set forth in a commonly owned copending U.S. patent application, Ser. No. 176,832, filed on Aug. 8, 1980, by Clelford et al.

The invention may be practiced in automatic flight control systems having single channels of inner loop or of outer loop, dual channels of inner loop or of outer loop, or more channels of either, in various combinations. The exemplary conditions, magnitudes, durations and relationships may of course be varied to suit any usage of the invention. Aspects of the invention may be practiced in automatic control of various functions, in addition to the illustrative functions described herein.

Similarly, although the invention has been shown and described with respect to an exemplary embodiment thereof, it should be understood by those skilled in the art that the foregoing and various other changes, omissions and additions may be made therein and thereto, without departing from the spirit and the scope of the invention.

We claim:

1. A system for positioning pitch-attitude-controlling aerodynamic surfaces of an aircraft, comprising:
    pitch attitude means for providing an actual attitude signal indicative of the actual attitude of the aircraft in its pitch axis;
    airspeed means for providing an airspeed signal indicative of actual aircraft airspeed;
    actuator means responsive to a command input signal applied thereto for positioning said aerodynamic surfaces; and
    signal processing means, connected for response to said pitch attitude means and said airspeed means, for providing a pitch reference signal indicative of the pitch attitude desired for the aircraft, for providing an airspeed reference signal indicative of a desired airspeed for the aircraft, for selectively providing an airspeed engage signal indicative of the fact that control of said actuator means includes commands for attaining said desired airspeed, for providing an attitude error signal indicative of the difference between said pitch reference signal and said actual attitude signal, for providing an airspeed error signal indicative of the difference between said airspeed signal and said airspeed reference signal, and for providing to said actuator means a pitch attitude command signal indicative of a desired change in air-craft pitch attitude in response to both said attitude error signal and said airspeed error signal when said airspeed engage signal is present;
    characterized by said signal processing means comprising means for providing said pitch attitude command signal in response to a proportional function of said attitude error signal, a proportional function of said airspeed error signal, and an integral function of said airspeed error signal, and, in response to said integral function exceeding a predetermined magnitude, reducing said integral function and adjusting said pitch reference signal in a manner to reduce said attitude error signal by substantially the same amount as said integral function is reduced.

2. A system according to claim 1 characterized by said signal processing means comprising means for reducing said attitude error signal and said integral function each by on the order of 60% of said predetermined magnitude.

3. A system according to claim 1 characterized by said signal processing means comprising means for causing said pitch reference signal to approach identity with said actual attitude signal at a finite rate equal to the rate of reduction of said integral function for a fixed time period commencing when said integral function exceeds said predetermined magnitude.

4. A system according to claim 3 characterized by said time period being on the order of one half second.

* * * * *